US008826539B2

(12) United States Patent
Dolan et al.

(10) Patent No.: US 8,826,539 B2
(45) Date of Patent: Sep. 9, 2014

(54) METHOD FOR FLEX CIRCUIT BONDING WITHOUT SOLDER MASK FOR HIGH DENSITY ELECTRICAL INTERCONNECT

(75) Inventors: Bryan R. Dolan, Rochester, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/472,734

(22) Filed: May 16, 2012

(65) Prior Publication Data

US 2013/0307903 A1 Nov. 21, 2013

(51) Int. Cl.
*B21D 53/76* (2006.01)
*B23P 17/00* (2006.01)
*B41J 2/135* (2006.01)

(52) U.S. Cl.
USPC ................................ 29/890.1; 347/44; 347/45

(58) Field of Classification Search
CPC ...... B41J 2/1603; B41J 2/1626; B41J 2/1631; B41J 2/1623
USPC ...................................... 29/890.1; 347/44, 45
See application file for complete search history.

(56) References Cited

U.S. PATENT DOCUMENTS

| | | | | |
|---|---|---|---|---|
| 8,071,413 | B2 * | 12/2011 | Wang | 438/50 |
| 8,360,557 | B2 * | 1/2013 | Andrews et al. | 347/68 |
| 2004/0253755 | A1 * | 12/2004 | Chen et al. | 438/21 |
| 2009/0113710 | A1 * | 5/2009 | Lin et al. | 29/890.1 |
| 2010/0295901 | A1 * | 11/2010 | Stephens et al. | 347/54 |
| 2011/0148993 | A1 * | 6/2011 | Andrews et al. | 347/71 |
| 2011/0298871 | A1 * | 12/2011 | Stephens et al. | 347/50 |
| 2012/0200631 | A1 * | 8/2012 | Paschkewitz | 347/18 |
| 2012/0222307 | A1 * | 9/2012 | Stephens et al. | 29/890.1 |
| 2012/0242756 | A1 * | 9/2012 | Nystrom et al. | 347/70 |
| 2012/0242758 | A1 * | 9/2012 | Cellura et al. | 347/71 |
| 2012/0274706 | A1 * | 11/2012 | Dolan et al. | 347/47 |

* cited by examiner

*Primary Examiner* — David Angwin
(74) *Attorney, Agent, or Firm* — MH2 Technology Law Group LLP

(57) ABSTRACT

In some aspects of the present application, a method of manufacturing a print head is disclosed. The method can include providing a jet stack including an array of jets, bonding an actuator layer to the jet stack, the actuator layer including an actuator array, applying a standoff adhesive layer to the actuator layer and the jet stack, the standoff layer having an array of holes, wherein each hole of the array of holes overlies one of the actuators of the actuator array. A flex circuit layer having an array of bumped contact pads is aligned such that each bumped contact pad aligns with one of the holes of the standoff adhesive. Further, the flex circuit layer is boned to the jet stack layer.

9 Claims, 4 Drawing Sheets

METHOD FOR FLEX CIRCUIT BONDING WITHOUT SOLDER MASK FOR HIGH DENSITY ELECTRICAL INTERCONNECT

FIELD OF THE DISCLOSURE

The present application is directed to print heads and methods for manufacturing the print heads.

BACKGROUND OF THE DISCLOSURE

Two goals for high density piezoelectric ink jet print heads are increased printing resolution and reduced cost. These objectives require advancements in multiple aspects of print head technology. One aspect concerns the electrical interconnect between the single jet piezoelectric actuator and its corresponding drive electronics. The traditional method for forming this multi-point electrical interconnect uses a patterned standoff adhesive with stenciled conductive epoxy above each actuator. However, this method faces issues as it's scaled to higher densities. Particularly, yield and reliability issues arise with excess epoxy causing shorting between adjacent actuators and too little epoxy causing open connections.

Accordingly, what is needed are improved print heads and methods of manufacturing print heads that are suitable for high density piezoelectric ink jet print heads.

SUMMARY OF THE DISCLOSURE

In accordance with some aspects of the present disclosure, a print head is disclosed. The print head can comprise an array of jets formed in a jet stack; at least one ink reservoir operable to deliver ink to the jet stack; an actuator array arranged on the control circuitry formed into an actuator layer to cause the reservoir to deliver ink in response to signals from the control circuitry; a standoff adhesive layer arranged on the actuator layer, the standoff adhesive layer having an array of holes corresponding to the actuators; and a flex circuit layer having an array of bumped contact pads corresponding to the array of holes of the standoff adhesive layer.

In some aspects, the print head can further comprise ink ports from the ink reservoirs in the control circuitry and the actuator array to allow the flow of ink from the ink reservoirs to the jet stack.

In some aspects, the array of jets are operable to deliver ink to an image receptor.

In some aspects, the control circuitry can be arranged on the jet stack and a ground plane can be arranged on a face of the actuator array opposite the control circuitry.

In some aspects, the arrangement between the array of bumped contact pads and the holes of the standoff adhesive layer can provide an electrically conductive path between the array of actuators and the flex circuit.

In some aspects, the array of actuators can include an array of piezoelectric actuators.

In some aspects, the jet stack can be bonded to the flex circuit layer by applying a bonding pressure between about 100 psi and about 150 psi at a temperature between about 170° C. and about 210° C. for between about 60 minutes and about 80 minutes. For example, the pressure can be about 100 psi at a temperature of about 90° C. for about 70 minutes.

In some aspects, the jet stack can be bonded to the flex circuit layer by applying a bonding pressure in an amount sufficient to allow the adhesive to cure by allowing outgassing to occur.

In some aspects, the jet stack can be bonded to the flex circuit layer by applying a bonding pressure in an amount that the standoff adhesive layer maintains a predetermined size so that electrically conductive portions of the flex circuit layer adjacent the each bumped contact do not contact an actuator in the actuator array to cause a short circuit in the print head.

In accordance with some aspects of the present disclosure, a method of manufacturing a print head is disclosed. The method can include providing a jet stack formed from an array of jets; bonding an actuator layer to the jet stack, the actuator layer including actuator array; applying a standoff adhesive layer to the actuator layer and the jet stack, the standoff adhesive layer having an array of holes corresponding to the actuator; aligning a flex circuit layer having an array of bumped contacts pad corresponding to the array of holes of the standoff adhesive layer; and bonding the flex circuit layer to the jet stack layer.

In some aspects, the method can further comprise forming ink ports from the ink reservoirs and the actuator array to allow the flow of ink from the ink reservoirs to the jet stack.

In some aspects, the array of jets can be operable to deliver ink to an image receptor.

In some aspects, the method can further comprise a providing control circuitry arranged on the jet stack and a ground plane arranged on a face of the actuator array opposite the control circuitry.

In some aspects, the arrangement between the array of bumped contact pads and the holes of the standoff adhesive layer can provide an electrically conductive path between the array of actuators and the flex circuit.

In some aspects, the array of actuators can include an array of piezoelectric actuators.

In some aspects, the jet stack can be bonded to the flex circuit layer by applying a bonding pressure between about 100 psi and about 150 psi at a temperature between about 170° C. and about 210° C. for between about 60 minutes and about 80 minutes. For example, the pressure can be about 100 psi at a temperature of about 90° C. for about 70 minutes.

In some aspects, the jet stack can be bonded to the flex circuit layer by applying a bonding pressure in an amount sufficient to allow the adhesive to cure by allowing outgassing to occur.

In some aspects, the jet stack can be bonded to the flex circuit layer by applying a bonding pressure in an amount that the standoff adhesive layer maintains a predetermined size so that each of the bumped contacts in the array of bumped contact does not cause a short circuit in the print head.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

Printing systems require interconnections between the print head and the driving circuitry. In ink jet systems, the circuitry provides the signals that cause the ink jets to delivery drops of ink to an image receptor. The ink jets reside in the print head and receive signals at an actuator that causes the jet to dispense ink. Each actuator generally corresponds to a jet, requiring that the signal traces from the driving circuitry also correspond to each actuator. Ensuring robust and properly aligned connections between the array of actuators and their driving circuits can prove challenging.

Figure 1:
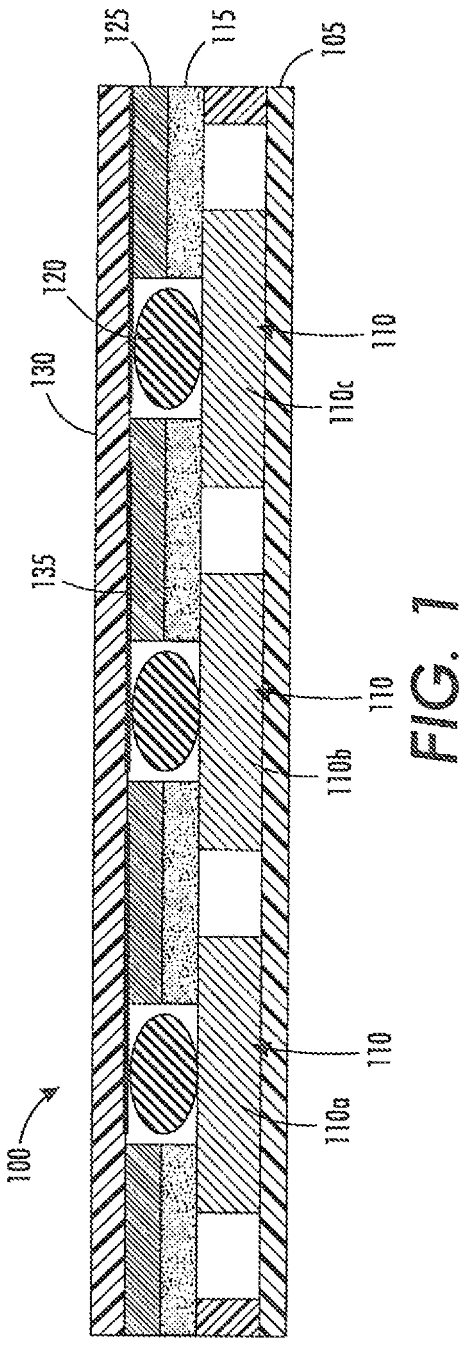
FIG. 1 PRIOR ART
FIG. 1 shows a cross-sectional diagram that illustrates the traditional approach for electrical interconnect.

FIG. 1 shows a cross-sectional diagram of a print head that illustrates the traditional approach for electrical interconnect. It should be readily apparent to one of ordinary skill in the art that the device depicted in FIG. 1 represents a generalized schematic illustration and that other components/devices can be added, removed, or modified. The jet stack generally will have an array of actuators or transducers arranged on it so as to cause the jets to deliver ink. The transducers may be of many different types, including piezoelectric transducers. For example, in thermal ink jet systems, the transducers could be heaters. A piezoelectric transducer may vibrate or otherwise move a diaphragm against a reservoir of ink, causing the ink to be forced out of the ink jet onto the image receptor.

Referring to FIG. 1, print head, shown generally at 100, includes jet stack 105 and actuator array 110. Actuator array 110 can include individual actuators 110*a*, 110*b*, and 110*c*. Patterned standoff adhesive layer 115 is first tacked to actuator array 110. Adhesive layer 115 is designed so as to have a single opening over each piezoelectric actuator 110*a*, 110*b*, and 110*c* of actuator array 110. Conductive epoxy 120 is then stenciled into each opening in adhesive layer 115. Finally, metalized flex circuit 130 is bonded to adhesive layer 115 and epoxy 120, and an electrical connection (not shown) is made to actuators 110*a*, 110*b*, and 110*c*. In this approach, solder mask 125 serves two functions. First, it provides electrical insulation between flex circuit trace pattern 135 and actuator array 110. Second, it prevents conductive epoxy 120 from shorting to adjacent traces. These two functions help to ensure an array of single point electrical connections from contact pad to actuator.

In some aspects, the flex circuit 130 can include conductive contacts (not shown) on a side opposite the flex circuit trace pattern 135, where both of which are connected to a circuitry (not shown) used to control the print head.

Different types of solder masks can be applied to the flex circuit in different ways. In an additive method, the solder mask can be patterned during its application (e.g., silk screened solder mask). In a subtractive method, the solder mask can be patterned after the entire flex circuit is covered (e.g., photoimageable dry film solder mask). In both cases, application and patterning of the solder mask adds cost to the flex circuit.

Aspects of the present disclosure relate to an approach to electrical interconnect that has been developed to address the abovementioned issues at higher densities. The approach involves using a flexible printed circuit with embossed (i.e. bumped) metal contact pads and a patterned standoff adhesive for alignment to the array of actuators. Without using conductive epoxy, this approach solely relies on the metal-to-metal asperity contact between pad and actuator. To avoid shorting the many conductive traces on the flex circuit, a protective insulating layer (e.g. solder mask) is added and patterned to only expose the contact pads.

Figure 2:
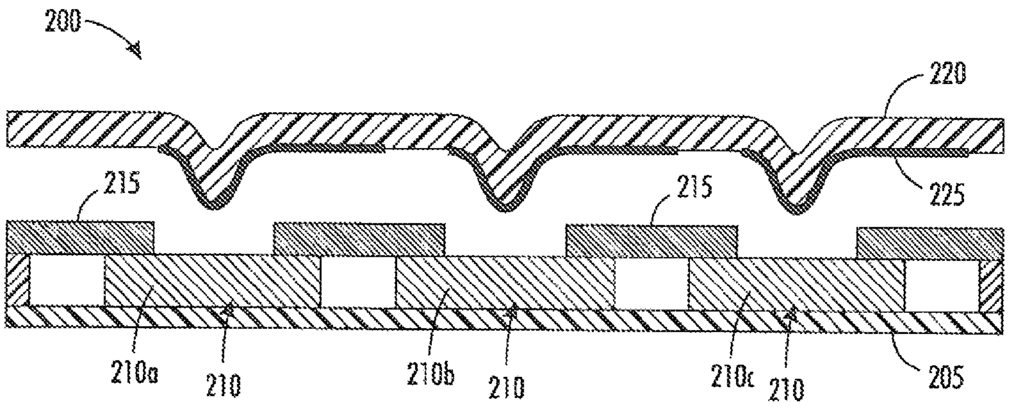
FIG. 2 shows an example cross-section of a flex circuit without solder mask aligned to an actuator array according to aspects of the present disclosure.
Figure 3:
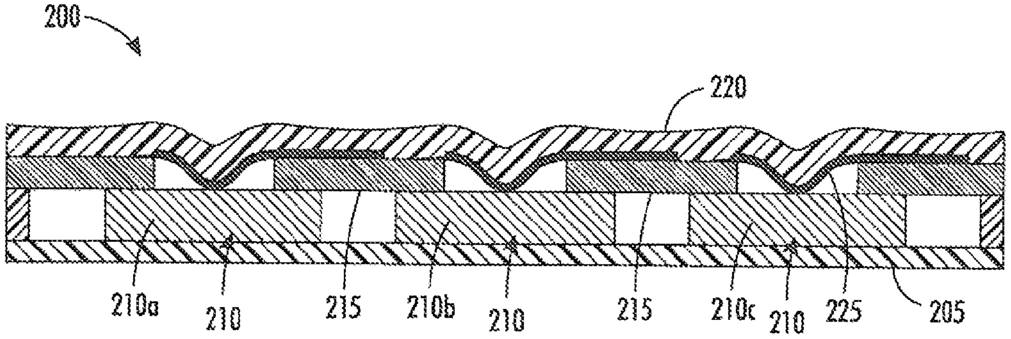
FIG. 3 shows a cross-sectional diagram of the resulting stack-up of FIG. 2.

FIGS. 2 and 3 show print head according to aspects of the present disclosure that enables flex circuit attach without solder mask. It should be readily apparent to one of ordinary skill in the art that the device depicted in FIGS. 2 and 3 represents a generalized schematic illustration and that other components/devices can be added, removed, or modified.

FIG. 2 shows a cross-section of a flex circuit without solder mask aligned to an actuator array. FIG. 3 shows a cross-sectional diagram of the resulting stack-up. Referring to FIGS. 2 and 3, a print head, shown generally at 200, includes jet stack 205 and actuator array 210. Actuator array 210 can include individual actuators 210*a*, 210*b*, and 210*c*. Patterned standoff adhesive layer 215 can be bonded to actuator array 210. Adhesive layer 215 can be designed so as to have a single opening over each piezoelectric actuator 210*a*, 210*b*, and 210*c* of actuator array 210. Metalized flex circuit 220 can be bonded to adhesive layer 215, and an electrical connection (not shown) can be made to actuators 210*a*, 210*b*, and 210*c*. The adhesive can include thermoset or thermoplastic adhesives. Electrical trace 225 can be arranged on the underside, the side adjacent to standoff adhesive layer 215, of flex circuit 220, which can provide control signals to be sent and/or received from a controller, which is further discussed below with reference to FIG. 4.

The amount or degree of collapse of the flex circuit's bumped contact pads can controlled during bonding. For example, the amount of collapse can be controlled by adjusting an amount of bonding pressure applied to the stacked layers of the print head, keeping in mind that the amount of bonding pressure can be dependent on a number of factors, including, metallization type, substrate material, and bonding temperature. By maintaining sufficient bump height throughout bonding, the bump itself can provide the physical spacing necessary to separate the flex circuit's conductive traces from the array of metallized actuators.

In some aspects, the adhesive can include a B-stage acrylic thermoset adhesive. By using this type of adhesive, the jet stack can be bonded to the flex circuit layer by applying a bonding pressure between about 100 psi and about 150 psi at a temperature between about 170° C. and about 210° C. for between about 60 minutes and about 80 minutes. For example, the pressure can be about 100 psi at a temperature of about 90° C. for about 70 minutes. Other examples of adhesives can include varieties of thermoset or thermoplastic adhesives with bonding temperatures between about 25° C. and about 300° C., pressures between about 5 psi and about 500 psi, and cure times between about 1 minute and 240 minutes.

In some aspects, the jet stack can be bonded to the flex circuit layer by applying a bonding pressure in an amount sufficient to allow the adhesive to cure by allowing outgassing to occur. In some aspects, the jet stack can be bonded to the flex circuit layer by applying a bonding pressure in an amount that the standoff adhesive layer maintains a predetermined size so that each of the bumped contacts in the array of bumped contact does not cause a short circuit in the print head.

Figure 4:
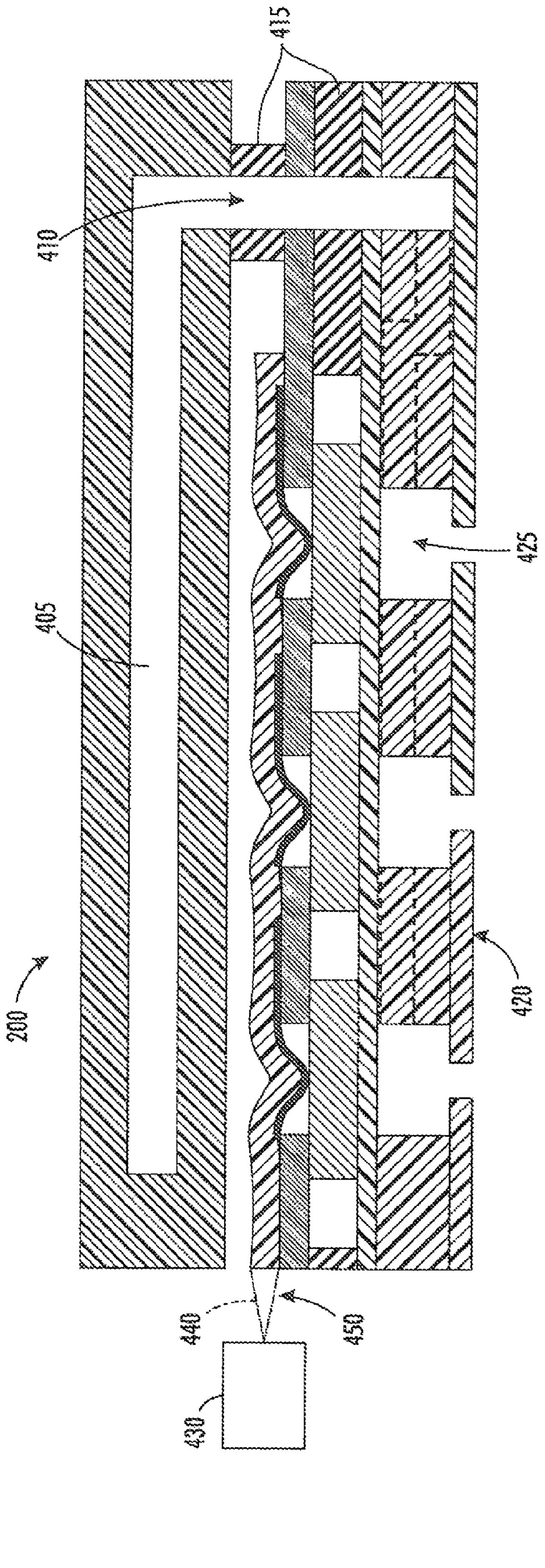
FIG. 4 shows the example stack-up of FIG. 3 with additional features shown.

FIG. 4 shows the example stack-up of FIG. 3 with additional features shown. A module having an internal ink reservoir 405 can be affixed or bonded to a portion of the print head. For example, the module containing ink reservoir 405 can be positioned on standoff adhesive layer 215. One or more gaskets can be used to provide a seal between adjacent layers of the print head. For example, gasket 415 can be arranged to provide a seal between the module containing the ink reservoir 405 and standoff adhesive layer 215. Additionally or alternatively, gasket 415 can be arranged to provide a seal between standoff adhesive layer 215 and jet stack 205. Ink can flow from ink reservoir 405 along ink path 410 through layers of the print head and out nozzle plate 420, which can include one or more individual nozzles. The ink path 410 is shown as a dotted line since the actual path is three-dimensional in nature, and is only depicted here as two-dimensional for simplicity. Body chamber 425 is arranged to function as the drop ejection chamber which is the ink chamber that sees the pressure impulse during an actuation cycle. Controller 430 can be arranged to control operation of print head through contacts 440 and 450 arranged on either side of flex circuit 230. For example, contact 450 can be electrical trace 225.

Figure 5:
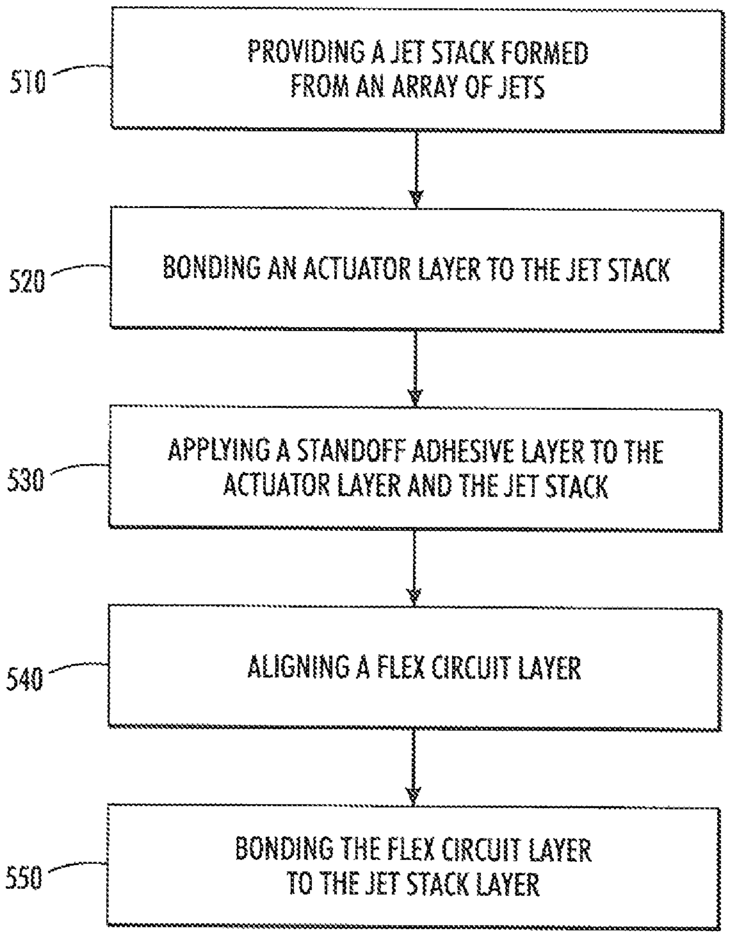
FIG. 5 shows an example method for forming the print head according to aspects of the present disclosure.

FIG. 5 shows an example method for forming the print head in accordance with aspects of the present disclosure. At 510, the method begins by providing a jet stack formed from an array of jets. At 520, the method continues by bonding an actuator layer to the jet stack, the actuator layer including actuator array. At 530, the method continues by applying a standoff adhesive layer to the actuator layer and the jet stack, the standoff adhesive layer having an array of holes corresponding to the actuator. At 540, the method continues by aligning a flex circuit layer having an array of bumped contact pads corresponding to the array of holes of the standoff adhesive layer. At 550, the method concludes by bonding the flex circuit layer to the jet stack layer.

In some aspects, the method can further comprise forming ink ports from the ink reservoirs and the actuator array to allow the flow of ink from the ink reservoirs to the jet stack. The method can further comprise a providing control circuitry arranged on the jet stack and a ground plane arranged on a face of the actuator array opposite the control circuitry.

To address the abovementioned failure mode, bonding pressure can be reduced in order to lessen the collapse of the bumped contact pad. It is noted that bonding pressure must still be maintained at a level sufficient enough to allow for proper adhesive curing. Pressure is used to provide interfacial contact and drive out any outgassing during curing. For this application, it has been experimentally verified that bonding with a pressure of 100 psi is sufficient for maintaining bump height and providing a robust bond. This is evidenced by test coupons that were built and tested to have 100% electrical interconnect yield.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of manufacturing a print head comprising:

providing a jet stack comprising an array of jets;

bonding an actuator layer to the jet stack, the actuator layer including actuator array;

applying a standoff adhesive layer to the actuator layer and the jet stack, the standoff adhesive layer having an array of holes, wherein each hole of the array of holes overlies one of the actuators of the actuator array;

aligning a flex circuit layer having an array of bumped contact pads, wherein each bumped contact pad of the array of bumped contact pads aligns with one of the holes of the array of holes of the standoff adhesive layer; and bonding the flex circuit layer to the jet stack layer.

2. The method of claim 1, the method further comprising forming ink ports from the ink reservoirs and the actuator array to allow the flow of ink from the ink reservoirs to the jet stack.

3. The method of claim 1, wherein the array of jets are operable to deliver ink to an image receptor.

4. The method of claim 1, the method further comprising a providing control circuitry arranged on the jet stack and a ground plane arranged on a face of the actuator array opposite the control circuitry.

5. The method of claim 1, wherein the arrangement between the array of bumped contact pads and the holes of the standoff adhesive layer provide an electrically conductive path between the array of actuators and the flex circuit.

6. The method of claim 1, wherein the array of actuators includes an array of piezoelectric actuators.

7. The method of claim 1, wherein the jet stack is bonded to the flex circuit layer by applying a bonding pressure between about 100 psi and about 150 psi at a temperature between about 170° C. and about 210° C. for between about 60 minutes and about 80 minutes.

8. The method of claim 1, wherein the jet stack is bonded to the flex circuit layer by applying a bonding pressure in an amount sufficient to allow the adhesive to cure.

9. The method of claim 1, wherein the jet stack is bonded to the flex circuit layer by applying a bonding pressure in an amount that the standoff adhesive layer maintains a predetermined size so that electrically conductive portions of the flex circuit layer that are adjacent to each bumped contact do not contact an actuator in the actuator array to cause a short circuit in the print head.

* * * * *